(12) United States Patent
Jojima

(10) Patent No.: US 9,755,561 B2
(45) Date of Patent: Sep. 5, 2017

(54) POWER SUPPLY DEVICE

(71) Applicant: Toyota Jidosha Kabushiki Kaisha, Toyota-shi, Aichi-ken (JP)

(72) Inventor: Yuki Jojima, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/363,451

(22) Filed: Nov. 29, 2016

(65) Prior Publication Data

US 2017/0155350 A1   Jun. 1, 2017

(30) Foreign Application Priority Data

Nov. 30, 2015 (JP) ................... 2015-234036

(51) Int. Cl.
| | |
|---|---|
| G05F 1/24 | (2006.01) |
| H02P 27/06 | (2006.01) |
| H02J 7/00 | (2006.01) |
| B60L 11/18 | (2006.01) |
| B60L 3/00 | (2006.01) |

(52) U.S. Cl.
CPC ............ *H02P 27/06* (2013.01); *H02J 7/0068* (2013.01); *B60L 3/0023* (2013.01); *B60L 11/1803* (2013.01)

(58) Field of Classification Search
CPC ...... H02P 11/04; H02P 11/06; H02P 2201/09; H02P 2201/07; H02P 2201/11; H02M 3/33584; H02M 2003/1552; H02M 3/1582; H02M 2001/4291
USPC ................... 323/259, 344; 363/101
See application file for complete search history.

(56) References Cited

U.S. PATENT DOCUMENTS

| | | | | |
|---|---|---|---|---|
| 2010/0296204 | A1* | 11/2010 | Ichikawa | ............... B60K 6/445 361/15 |
| 2014/0240872 | A1* | 8/2014 | Nomura | ............... H02M 3/156 361/18 |
| 2016/0344329 | A1* | 11/2016 | Xu | ........................... H02P 6/12 |

FOREIGN PATENT DOCUMENTS

JP   2011-114918 A   6/2011

* cited by examiner

*Primary Examiner* — Bickey Dhakal
(74) *Attorney, Agent, or Firm* — Dinsmore & Shohl LLP

(57) ABSTRACT

A power supply device includes: a first electric power line; a second electric power line; a first boost converter; a second boost converter; a first current sensor; a second current sensor; a third current sensor; and an electronic control unit. The electronic control unit is configured to determine that a third switching element of the second boost converter has an on-failure when a battery current is a value at a time of being discharged from a battery, a first reactor current is a value at a time of passing from a side of a second positive electrode line to a side of a first center point, and a second reactor current is a value at a time of passing from a side of a second center point to a side of a second positive electrode line.

3 Claims, 3 Drawing Sheets

POWER SUPPLY DEVICE

CROSS-REFERENCE TO RELATED APPLICATIONS

This application claims priority to Japanese Patent Application No. 2015-234036 filed on Nov. 30, 2015, the entire contents of which are hereby incorporated by reference.

BACKGROUND

1. Technical Field

The present disclosure relates to power supply devices, and more particularly relates to a power supply device including a battery, and first and second boost converters.

2. Description of Related Art

As a power supply device of this type, there has conventionally been proposed a device including: a power supply; and first and second boost converters each connected to a first power line and a second power line in parallel with each other, the first power line being connected to a load, the second power line being connected to the power supply, the first and second boost converters being configured to supply electric power of the second power line to the first power line while boosting a voltage of the electric power (see, for example, Japanese Patent Application Publication No. 2011-114918). The first boost converter has: first and second switching elements (a first upper arm and a first lower arm) connected in series between a positive electrode line of the first electric power line and negative electrode lines of the first and second electric power lines; first and second diodes connected in parallel to the first and second switching elements each in an opposite direction; and a first reactor connected to a first center point between the first switching element and the second switching element and to a positive electrode line of the second electric power line. The second boost converter has: third and fourth switching elements (a second upper arm and a second lower arm) connected in series between the positive electrode line of the first electric power line and the negative electrode lines of the first and second electric power lines; third and fourth diodes connected in parallel to the third and fourth switching elements each in the opposite direction; and a second reactor connected to a second center point between the third switching element and the fourth switching element and to the positive electrode line of the second electric power line.

SUMMARY

Such a power supply device is demanded to perform more reliable detection of an on-failure of the first and second upper arms of the first and second boost converters. If new components are provided for detection of the on-failure (for example, components such as a sensor dedicated for detection of the on-failure), a parts count and cost are increased.

The present disclosure provides a power supply device that performs more reliable detection of an on-failure of the first and second upper arms of the first and second boost converters.

A power supply device according to one aspect of the present disclosure includes: a first electric power line; a second electric power line; a first boost converter; a second boost converter; a first current sensor; a second current sensor; a third current sensor; and an electronic control unit. The first electric power line is connected to a load. The first electric power line includes a first positive electrode line and a first negative electrode line. The second electric power line is connected to a battery. The second electric power line includes a second positive electrode line and a second negative electrode line. The second negative electrode line is connected with the first negative electrode line. The first boost converter is connected to the first electric power line and the second electric power line. The first boost converter is configured to supply electric power of the second electric power line to the first electric power line while boosting a voltage of the electric power. The first boost converter includes a first switching element, a second switching element, a first diode, a second diode, and a first reactor. The first switching element and the second switching element are connected in series between the first positive electrode line and one of the first negative electrode line and the second negative electrode line. The first diode is connected in parallel to the first switching element in an opposite direction. The second diode is connected in parallel to the second switching element in the opposite direction. The first reactor is connected to a first center point that is a center point between the first switching element and the second switching element and to the second positive electrode line. The second boost converter is connected to the first electric power line and the second electric power line in parallel with the first boost converter. The second boost converter is configured to supply the electric power of the second electric power line to the first electric power line while boosting the voltage of the electric power. The second boost converter includes: a third switching element; a fourth switching element; a third diode; a fourth diode; and a second reactor. The third switching element and the fourth switching element are connected in series between the first positive electrode line and one of the first negative electrode line and the second negative electrode line. The third diode is connected in parallel to the third switching element in the opposite direction. The fourth diode is connected in parallel to the fourth switching element in the opposite direction. The second reactor is connected to a second center point that is a center point between the third switching element and the fourth switching element and to the second positive electrode line. The first current sensor is configured to detect a battery current that charges and discharges the battery. The second current sensor is configured to detect a first reactor current passing through the first reactor. The third current sensor is configured to detect a second reactor current passing through the second reactor. The electronic control unit is configured to determine that the third switching element has an on-failure when the battery current is a value at a time of being discharged from the battery, the first reactor current is a value at a time of passing from a side of the second positive electrode line to a side of the first center point, and the second reactor current is a value at a time of passing from a side of the second center point to the side of the second positive electrode line. The electronic control unit is configured to determine that the first switching element has an on-failure when the battery current is a value at a time of being discharged from the battery, the second reactor current is a value at a time of passing from the side of the second positive electrode line to the side of the second center point, and the first reactor current is a value at a time of passing from the side of the first center point to the side of the second positive electrode line.

The power supply device according to the aspect includes the first current sensor configured to detect the battery current that charges and discharges the battery, the second current sensor configured to detect the first reactor current passing through the first reactor, and the third current sensor configured to detect the second reactor current passing through the second reactor. Here, the first current sensor is used to manage the battery. The second current sensor is used to manage and control the first boost converter, and the third current sensor is used to manage and control the second boost converter. Therefore, the power supply device generally includes the first to third current sensors.

It is determined that the third switching element (upper arm) of the second boost converter has an on-failure when the battery current detected by the first current sensor is a value (for example, a positive value) at the time of being discharged from the battery, the first reactor current detected by the second current sensor is a value (for example, a positive value) at the time of passing from the side of the second positive electrode line to the side of the first center point, and the second reactor current detected by the third current sensor is a value (for example, a negative value) at the time of passing from the side of the second center point to the side of the second positive electrode line. When the battery current is a value (for example, a positive value) at the time of being discharged from the battery, and the first reactor current is a value (for example, a positive value) at the time of passing from the side of the second positive electrode line to the side of the first center point, it can be considered that the electric power from the battery (electric power of the second electric power line) is supplied to the load (first electric power line) while the voltage of the electric power is boosted by the first boost converter. In this case, if the second reactor current is a value at the time of passing from the side of the second center point to the side of the second positive electrode line, it can be considered that the current passes (the electric power is supplied) from the first electric power line to the second electric power line through the third switching element (upper arm) and the second reactor due to the on-failure of the third switching element. Therefore, by checking the direction (sign) of the battery current, the first reactor current, and the second reactor current, more reliable detection of the on-failure of the third switching element (upper arm) can be performed.

It is determined that the first switching element (upper arm) of the first boost converter has an on-failure when the battery current detected by the first current sensor is a value at the time of being discharged from the battery, the second reactor current detected by the third current sensor is a value at the time of passing from the side of the second positive electrode line to the side of the second center point, and the first reactor current detected by the second current sensor is a value at the time of passing from the side of the first center point to the side of the second positive electrode line. Because of the same reason as described before, more reliable detection of the on-failure of the first switching element (upper arm) can be performed by checking the direction (sign) of the battery current, the first reactor current, and the second reactor current.

As a result, more reliable detection of the on-failure of the first and third switching elements (upper arms) of the first and second boost converters can be performed without new components (for example, components such as sensors dedicated for detection of the on-failure of the first and third switching elements) provided in addition to the first to third current sensors.

In the power supply device according to the aspect, the electronic control unit may be configured to control the first boost converter and the second boost converter such that boosting by the first boost converter and the second boost converter is stopped when the on-failure of the first switching element or the on-failure of the third switching element is detected. Moreover, the load may be a motor.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION

Now, a mode for carrying out the present disclosure will be described in detail with reference to particular embodiments.

Figure 1:
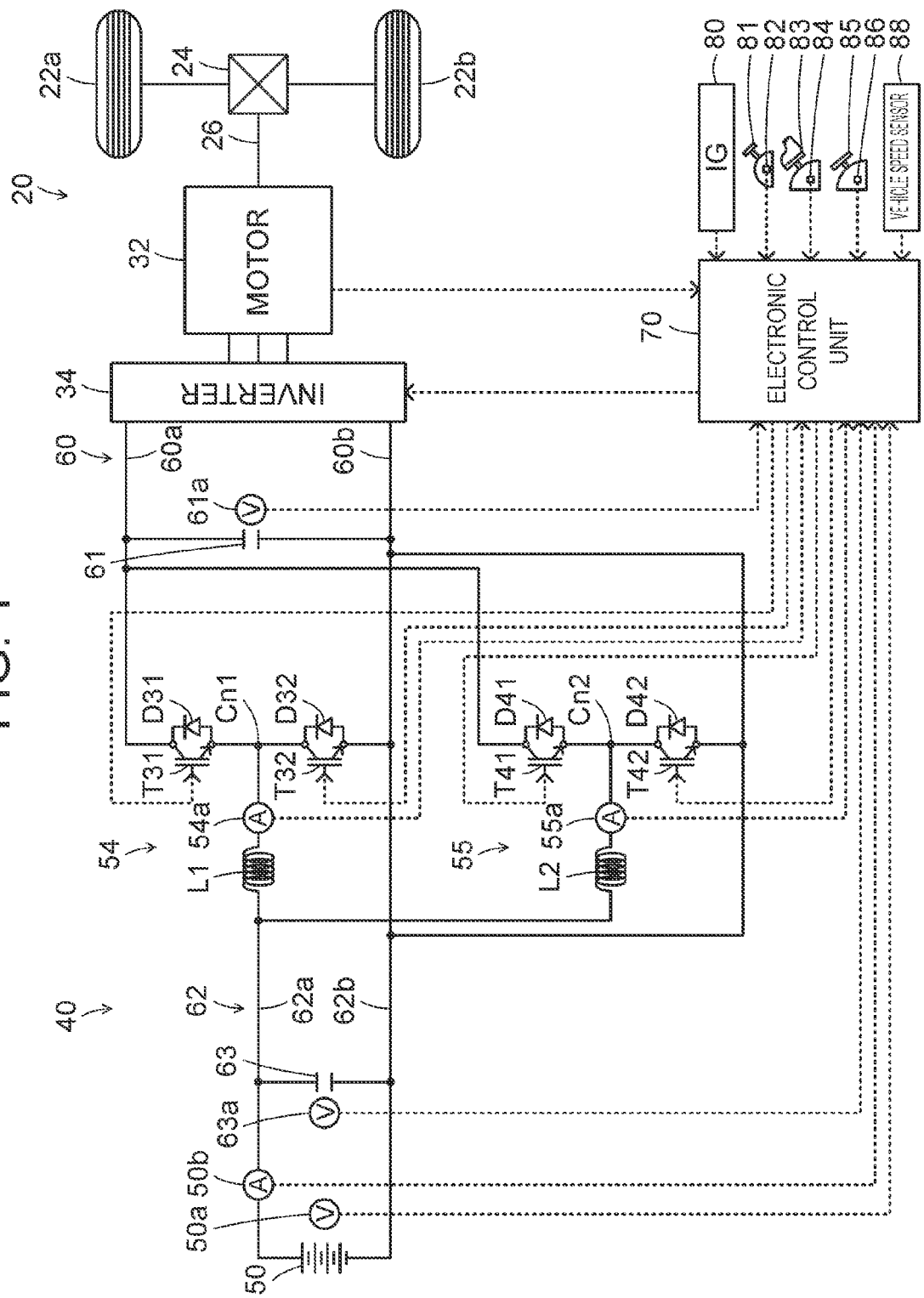
FIG. 1 is a block diagram illustrating an outlined configuration of an electric vehicle 20 incorporating a power supply device 40 according to embodiments of the present disclosure.

FIG. 1 is a block diagram illustrating an outlined configuration of the electric vehicle 20 incorporating the power supply device 40 according to embodiments of the present disclosure. As illustrated in FIG. 1, the electric vehicle 20 includes a motor 32 as a load, an inverter 34, a battery 50, first and second boost converters 54, 55, and an electronic control unit 70.

For example, the motor 32 as a load is configured as a synchronous generator-motor, and a rotor of the motor 32 is connected to a driving shaft 26 coupled to driving wheels 22a, 22b through a differential gear 24. The inverter 34 is connected with the motor 32 and is also connected with the first and second boost converters 54, 55 through a high-voltage system electric power line 60 as the first electric power line. The motor 32 is rotationally driven when the electronic control unit 70 controls switching of a plurality of switching elements of the inverter 34 which are not illustrated.

For example, the battery 50 is configured as a lithium-ion secondary battery or a nickel-hydrogen secondary battery. The battery 50 is connected with the first and second boost converters 54, 55 through a low-voltage system electric power line 62 as the second electric power line.

The first boost converter 54 is connected to the high-voltage system electric power line 60 connected to the inverter 34 and is also connected to the low-voltage system electric power line 62 connected to the battery 50. The first boost converter 54 has two transistors T31, T32, two diodes D31, D32, and a reactor L1. The transistor T31 is connected to a positive electrode line 60a of the high-voltage system electric power line 60. The transistor T32 is connected to the transistor T31, a negative electrode line 60b of the high-voltage system electric power line 60, and a negative electrode line 62b of the low-voltage system electric power line 62. Two diodes D31, D32 are connected in parallel with the transistors T31, T32 in the opposite direction, respectively. The reactor L1 is connected to a center point Cn1 between the transistor T31 and the transistor T32 and to the positive electrode line 62a of the low-voltage system electric power line 62. With a ratio of turn-on time of the transistors T31, T32 being regulated by the electronic control unit 70, the first boost converter 54 boosts and supplies the electric power of the low-voltage system electric power line 62 to the high-voltage system electric power line 60, or lowers and supplies the electric power of the high-voltage system electric power line 60 to the low-voltage system electric power line 62. Hereinafter, the transistor T31 is referred to as "first upper arm", and the transistor T32 is referred to as "first lower arm."

The second boost converter 55 is connected to the high-voltage system electric power line 60 and the low-voltage system electric power line 62 in parallel with the first boost converter 54. The second boost converter 55 has two transistors T41, T42, two diodes D41, D42, and a reactor L2 as in the case of the first boost converter 54. The transistor T41 is connected to the positive electrode line 60a of the high-voltage system electric power line 60. The transistor T42 is connected to the transistor T41, the negative electrode line 60b of the high-voltage system electric power line 60, and the negative electrode line 62b of the low-voltage system electric power line 62. Two diodes D41, D42 are connected in parallel to the transistors T41, T42 in the opposite direction, respectively. The reactor L2 is connected to a center point Cn2 between the transistor T41 and the transistor T42 and to the positive electrode line 62a of the low-voltage system electric power line 62. With a ratio of turn-on time of the transistors T41, T42 being regulated by the electronic control unit 70, the second boost converter 55 boosts and supplies the electric power of the low-voltage system electric power line 62 to the high-voltage system electric power line 60, or lowers and supplies the electric power of the high-voltage system electric power line 60 to the low-voltage system electric power line 62. Hereinafter, the transistor T41 is referred to as "second upper arm", and the transistor T42 is referred to as "second lower arm."

The positive electrode line 60aand the negative electrode line 60bof the high-voltage system electric power line 60 are equipped with a smoothing capacitor 61. The positive electrode line 62aand the negative electrode line 62bof the low-voltage system electric power line 62 are equipped with a smoothing capacitor 63.

Although not illustrated, the electronic control unit 70 is configured as a microprocessor having a CPU as a main component. The electronic control unit 70 includes a ROM that stores processing programs, a RAM that temporarily stores data, and input and output ports in addition to the CPU.

The electronic control unit 70 receives signals from various sensors through input ports. The signals input into the electronic control unit 70 includes: a rotational position θm from a rotational position detection sensor that detects a rotational position of the rotor of the motor 32; a phase current from a current sensor that detects a current that passes each phase of the motor 32; a voltage VB of the battery 50 from a voltage sensor 50ainstalled between terminals of the battery 50; a current IB of the battery 50 (which is a positive value at the time of being discharged from the battery 50) from a current sensor 50battached to an output terminal of the battery 50; a voltage VH of the capacitor 61 (high-voltage system electric power line 60) from a voltage sensor 61a attached between terminals of the capacitor 61; a voltage VL of the capacitor 63 (low-voltage system electric power line 62) from a voltage sensor 63a attached between terminals of the capacitor 63; a current IL1 of the reactor L1 (which becomes a positive value at the time of passing from the side of the reactor L1 to the side of the center point Cn1 1) from a current sensor 54a that detects a current passing through the reactor L1; a current IL2 of the reactor L2 (which becomes a positive value at the time of passing from the side of the reactor L2 to the side of the center point Cn2) from a current sensor 55a that detects a current passing through the reactor L2; an ignition signal from an ignition switch 80; a shift position SP from a shift position sensor 82 that detects an operative position of the shift lever 81; an accelerator opening Acc from an accelerator pedal position sensor 84 that detects a stepping-in amount of an accelerator pedal 83; a brake pedal position BP from a brake pedal position sensor 86 that detects a stepping-in amount of a brake pedal 85; and a vehicle speed V from a vehicle speed sensor 88.

The electronic control unit 70 outputs various control signals through the output port. The signals output from the electronic control unit 70 includes: switching control signals to a plurality of switching elements of the inverter 34 which are not illustrated; and switching control signals for the transistors T31, T32, T41, T42 of the first and second boost converters 54, 55.

The electronic control unit 70 performs operation such as arithmetic calculation of parameters including: the number of rotations Nm of the motor 32 based on the rotational position θm of the rotor of the motor 32 from the rotational position detection sensor; and a state of charge SOC of the battery 50 based on an integrated value of the current IB of the battery 50 from the current sensor 50b.

The state of charge SOC of the battery 50 refers to a ratio of capacity of electric power dischargeable from the battery 50 to the total capacity of the battery 50.

In some embodiments, the power supply device 40 corresponds to the battery 50, the first and second boost converters 54, 55, the current sensor 50b, the current sensor 54a, the current sensor 55a, and the electronic control unit 70.

In the electric vehicle 20 in some embodiments configured in this way, the electronic control unit 70 first sets a request torque Tp* that is requested for traveling (requested for the driving shaft 26) based on the accelerator opening Acc and the vehicle speed V, and sets the set request torque Tp* as a torque command Tm* of the motor 32. Next, the electronic control unit 70 sets a target voltage VH* of the high-voltage system electric power line 60 based on a target driving point of the motor 32 (torque command Tm*, the number of rotations Nm).

Next, a target electric power Pm* of the motor 32 is computed as a product of the torque command Tm* and the number of rotations Nm of the motor 32.

Next, based on the voltage VH and the target voltage VH* of the high-voltage system electric power line 60 and on the target electric power Pm* of the motor 32, a target current IL* is set as a target value of the total current passing from the low-voltage system electric power line 62 to the high-voltage system electric power line 60. Then, the target current IL* is multiplied by distribution ratios D1, D2 of the first and second boost converters 54, 55 (reactors L1, L2) to set target currents IL1*, IL2* of the reactors L1, L2. Here, the distribution ratios D1, D2 refer to ratios of the target currents IL1* and IL2* that pass from the low-voltage system electric power line 62 to the high-voltage system electric power line 60 through the first and second boost converters 54, 55 (reactors L1, L2), respectively. A sum of the distribution ratio D1 and the distribution ratio D2 equals to a value 1. The distribution ratio D1 can be set to 0.5, for example.

Then, switching control is performed on the plurality of switching elements of the inverter 34 such that the motor 32 is driven with the torque command Tm*. Switching control is also performed on the transistors T31, T32, T41, T42 of the first and second boost converters 54, 55 such that the currents IL1, IL2 of the reactors L1, L2 of the first and second boost converters 54, 55 become the target currents IL1*, IL2*.

Figure 2:
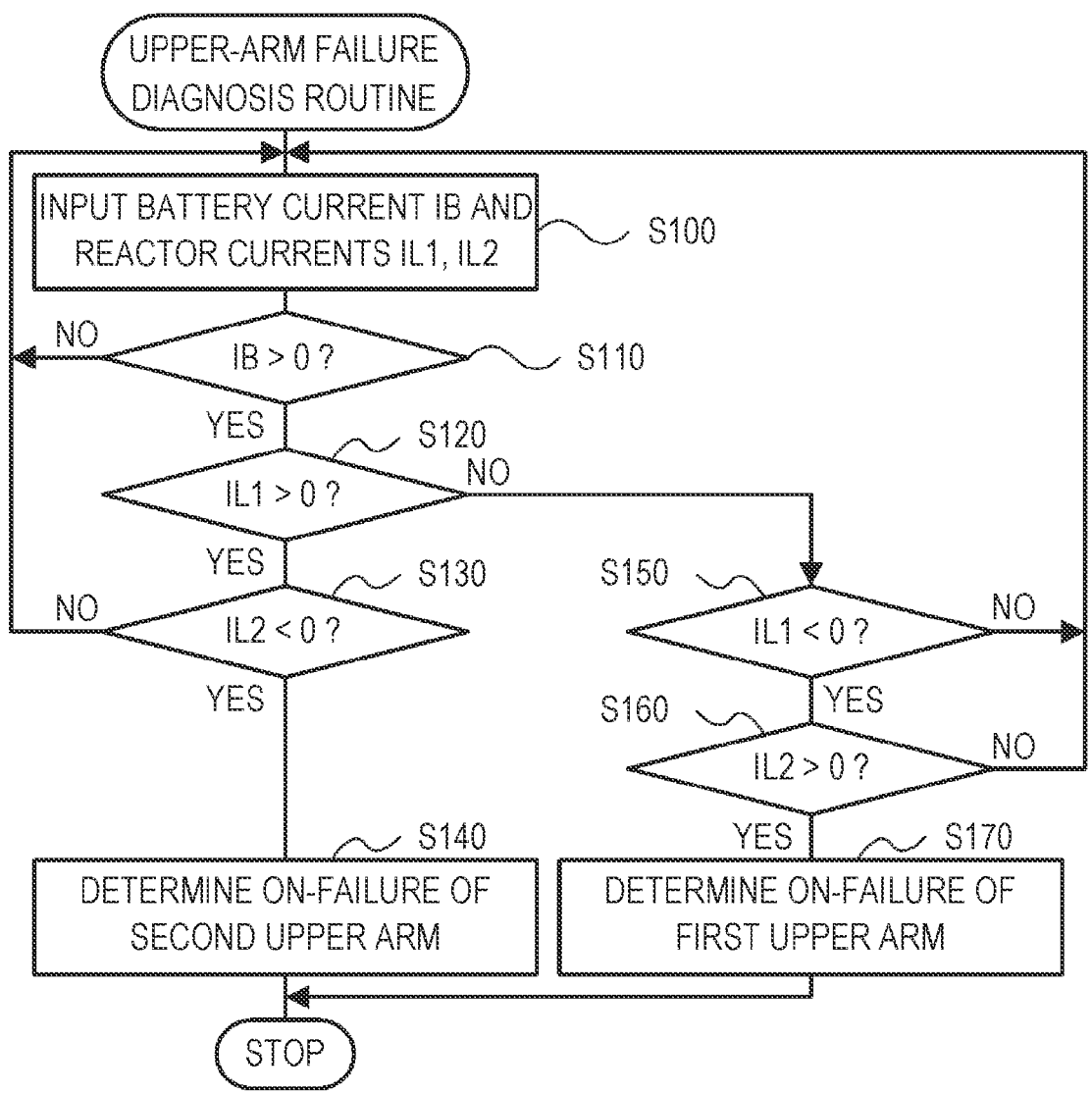
FIG. 2 is a flowchart illustrating one example of an upper-arm failure diagnosis routine executed by an electronic control unit 70 in some embodiments.

A description is now given of the operation of the electric vehicle 20 in some thus-configured embodiments, and more particularly the operation performed at the time of diagnosing whether or not the first and second upper arms (transistors T31, T41) of the first and second boost converters 54, 55 have an on-failure. FIG. 2 is a flowchart illustrating one example of an upper-arm failure diagnosis routine executed by the electronic control unit 70 in some embodiments. Execution of the routine is started when the system is started up.

When the upper-arm failure diagnosis routine of FIG. 2 is executed, the electronic control unit 70 first inputs data such as the current IB of the battery 50, the current IL1 of the reactor L1, and the current IL2 of the reactor L2 (step S100). Here, the current IB of the battery 50 to be input is a value (which becomes a positive value at the time of being discharged from the battery 50) detected by the current sensor 50b. The current IL1 of the reactor L1 to be input is a value (which becomes a positive value at the time of passing from the side of the reactor L1 to the side of the center point Cn1) detected by the current sensor 54a. The current IL2 of the reactor L2 to be input is a value (which becomes a positive value at the time of passing from the side of the reactor L2 to the side of the center point Cn2) detected by the current sensor 55a.

Once the data is input in this way, it is determined whether or not the current IB of the battery 50 is a positive value (step S110), and when the current IB of the battery 50 is not a positive value (but a value zero or a negative value), the processing returns to step S100.

When the current IB of the battery 50 is a positive value in step S110, it is determined whether or not the current IL1 of the reactor L1 is a positive value (step S120). When the current IL1 of the reactor L1 is a positive value, it is determined whether or not the current IL2 of the reactor L2 is a negative value (step S130).

When the current IL2 of the reactor L2 is not a negative value (but a value zero or a positive value) in step S130, the processing returns to step S100.

When the current IL2 of the reactor L2 is a negative value in step 5130, that is, when the current IB of the battery 50 is a positive value, the current IL1 of the reactor L1 is a positive value, and the current IL2 of the reactor L2 is a negative value in steps S110 to S130, then it is determined that the second upper arm (transistor T41) of the second boost converter 55 has an on-failure (step S140), and the main routine is ended.

When the current IB of the battery 50 is a positive value and the current IL1 of the reactor L1 is a positive value, it can be considered that the electric power (electric power of the low-voltage system electric power line 62) from the battery 50 is supplied to the motor 32 (high-voltage system electric power line 60) while the voltage of the electric power is boosted by the first boost converter 54. In this case, it can be considered that the current IL2 of the reactor L2 is a negative value because electric power is supplied from the high-voltage system electric power line 60 to the low-voltage system electric power line 62 through the second boost converter 55 (current passes from the positive electrode line 60a to the positive electrode line 62a through the second upper arm and the reactor L2) due to the on-failure of the second upper arm (transistor T41).

Therefore, more reliable detection of the on-failure of the second upper arm can be achieved by checking the sign of the current IB of the battery 50, the current IL1 of the reactor L1, and the current IL2 of the reactor L2.

Once the on-failure of the second upper arm (transistor T41) is detected in this way, driving of the first and second boost converters 54, 55 is stopped. In this case, evacuation travelling can be performed by supplying the electric power from the battery 50 to the motor 32 (through the reactors L1, L2 and the diodes D31, D41) without boosting of the voltage by the first and second boost converters 54, 55.

When the current IL1 of the reactor L1 is not a positive value (but a value zero or a negative value) in step S120, it is determined whether or not the current IL1 of the reactor L1 is a negative value (step S150), and when the current IL1 of the reactor L1 is not a negative value (but a value zero), then the processing returns to step S100.

When the current IL1 of the reactor L1 is a negative value in step S150, it is determined whether or not the current IL2 of the reactor L2 is a positive value (step S160). When the current IL2 of the reactor L2 is not a positive value (but a value zero or a negative value), the processing returns to step S100.

When the current IL2 of the reactor L2 is a positive value in step S160, it is determined that the first upper arm (transistor T31) of the first boost converter 54 has an on-failure (step S170), and the main routine is ended.

When the current IB of the battery 50 is a positive value and the current IL2 of the reactor L2 is a positive value, it can be considered that the electric power (electric power of the low-voltage system electric power line 62) from the battery 50 is supplied to the motor 32 (high-voltage system electric power line 60) while the voltage of the electric power is boosted by the second boost converter 55. In this case, it can be considered that the current IL1 of the reactor L1 is a negative value because electric power is supplied from the high-voltage system electric power line 60 to the low-voltage system electric power line 62 through the first boost converter 54 (current passes from the positive electrode line 60a to the positive electrode line 62a through the first upper arm and the reactor L1) due to the on-failure of the first upper arm (transistor T31). Therefore, more reliable detection of the on-failure of the first upper arm can be achieved by checking the sign of the current IB of the battery 50, the current IL1 of the reactor L1, and the current IL2 of the reactor L2.

Once the on-failure of the first upper arm (transistor T31) is detected in this way, driving of the first and second boost converters 54, 55 is stopped. In this case, evacuation travelling can be performed by supplying the electric power from the battery 50 to the motor 32 without boosting of the voltage by the first and second boost converters 54, 55 as described before.

Figure 3:
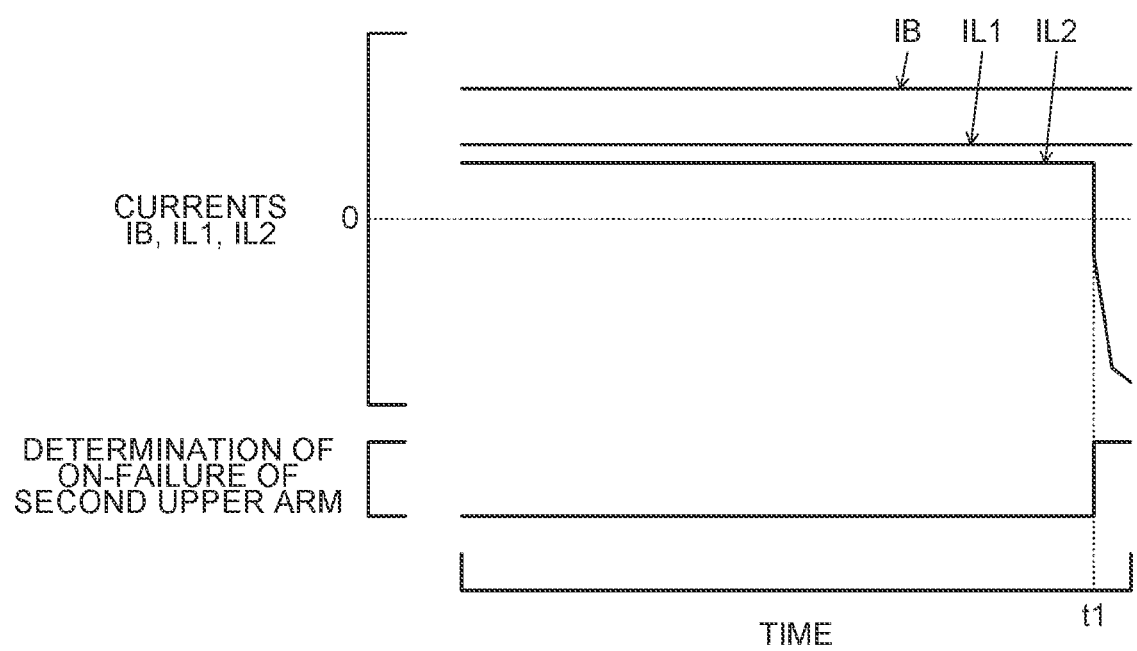
FIG. 3 is an explanatory view illustrating one example of temporal changes in a current IB of a battery 50, a current IL1 of a reactor L1, and a current IL2 of a reactor L2.

FIG. 3 is an explanatory view illustrating one example of temporal changes in the current IB of the battery 50, the current IL1 of the reactor L1, and the current IL2 of the reactor L2. As illustrated in the drawing, at the time (time t1) when only the current IL2 of the reactor L2 becomes a negative value from the state where the current IB of the battery 50, the current IL1 of the reactor L1, and the current IL2 of the reactor L2 are positive values, it is determined that the second upper arm (transistor T41) of the second boost converter 55 has an on-failure. Thus, the on-failure of the second upper arm can be detected.

In the power supply device 40 incorporated in the electric vehicle 20 in some embodiments described in the foregoing, it is determined that the second upper arm (transistor T41) of the second boost converter 55 has an on-failure when the current IB of the battery 50 is a positive value, the current IL1 of the reactor L1 is a positive value, and the current IL2 of the reactor L2 is a negative value. It is also determined that the first upper aim (transistor T31) of the first boost converter 54 has an on-failure when the current IB of the battery 50 is a positive value, the current IL2 of the reactor L2 is a positive value, and the current IL1 of the reactor L1 is a negative value. Thus, by checking the sign of the current IB of the battery 50, the current IL1 of the reactor L1, and the current IL2 of the reactor L2, more reliable detection of the on-failure of the first and second upper arms in the first and second boost converters 54, 55 can be achieved without new sensors (for example, sensors such as sensors dedicated for detection of the on-failure of the first and second upper arms) provided in addition to the current sensors 50b, 54a, and 55a.

In some embodiments, the power supply device 40 is incorporated in the electric vehicle 20 that travels only with motive power from the motor 32. However, the power supply device may be incorporated in the hybrid vehicle that travels using the motive power from the motor and the motive power from the engine.

Correspondence between the elements of the embodiments described in the Detailed Description and the elements of the Summary will be described. In some embodiments, the battery 50 corresponds to "battery" and the first boost converter 54 corresponds to "first boost converter", the second boost converter 55 corresponds to "second boost converter", the current sensor 50b corresponds to "first current sensor", the current sensor 54a corresponds to "second current sensor", the current sensor 55a corresponds to "third current sensor", and the electronic control unit 70 that executes the upper-arm failure diagnosis routine of FIG. 2 corresponds to "the electronic control unit."

The correspondence between the elements of the embodiments described in the Detailed Description and the elements of the Summary are exemplary. Accordingly, the correspondence is not intended to limit the elements of the Summary. More specifically, the Summary should be interpreted based on the description therein, and the embodiments described in the Detailed Description merely provide specific examples of the Summary.

Although the mode for carrying out the present disclosure has been described using particular embodiments, the present disclosure is not limited in any manner to the embodiments disclosed. It should naturally be understood that the present disclosure can be carried out in various modes without departing from the scope of the present disclosure.

The present disclosure is applicable in the fields such as manufacturing of the power supply device.

What is claimed is:

1. A power supply device, comprising:
a first electric power line connected to a load, the first electric power line including a first positive electrode line and a first negative electrode line;
a second electric power line connected to a battery, the second electric power line including a second positive electrode line and a second negative electrode line, the second negative electrode line being connected with the first negative electrode line;
a first boost converter connected to the first electric power line and the second electric power line, the first boost converter being configured to supply electric power of the second electric power line to the first electric power line while boosting a voltage of the electric power, the first boost converter including: a first switching element; a second switching element; a first diode; a second diode; and a first reactor, the first switching element and the second switching element being connected in series between the first positive electrode line and one of the first negative electrode line and the second negative electrode line, the first diode being connected in parallel to the first switching element in an opposite direction, the second diode being connected in parallel to the second switching element in the opposite direction, the first reactor being connected to a first center point that is a center point between the first switching element and the second switching element and to the second positive electrode line;
a second boost converter connected to the first electric power line and the second electric power line in parallel with the first boost converter, the second boost converter being configured to supply the electric power of the second electric power line to the first electric power line while boosting the voltage of the electric power, the second boost converter including: a third switching element; a fourth switching element; a third diode; a fourth diode; and a second reactor, the third switching element and the fourth switching element being connected in series between the first positive electrode line and one of the first negative electrode line and the second negative electrode line, the third diode being connected in parallel to the third switching element in the opposite direction, the fourth diode being connected in parallel to the fourth switching element in the opposite direction, the second reactor being connected to a second center point that is a center point between the third switching element and the fourth switching element and to the second positive electrode line;
a first current sensor configured to detect a battery current that charges and discharges the battery;
a second current sensor configured to detect a first reactor current passing through the first reactor;
a third current sensor configured to detect a second reactor current passing through the second reactor; and
an electronic control unit configured to determine that the third switching element has an on-failure when the battery current is a value at a time of being discharged from the battery, the first reactor current is a value at a time of passing from a side of the second positive electrode line to a side of the first center point, and the second reactor current is a value at a time of passing from a side of the second center point to the side of the second positive electrode line, the electronic control unit being configured to determine that the first switching element has an on-failure when the battery current is a value at a time of being discharged from the battery, the second reactor current is a value at a time of passing from the side of the second positive electrode line to a side of the second center point, and the first reactor current is a value at a time of passing from the side of the first center point to the side of the second positive electrode line.

2. The power supply device according to claim 1, wherein the electronic control unit is configured to control the first boost converter and the second boost converter such that boosting by the first boost converter and the second boost converter is stopped, when one of the on-failure of the first switching element and the on-failure of the third switching element is detected.

3. The power supply device according to claim 1, wherein the load is a motor.

* * * * *